April 28, 1970  C. O. MERCHANT  3,509,306
METHODS OF PROJECTION WELDING MOUNTING STRAPS TO CATHODE
RAY ELECTRODES AND THE LIKE
Filed March 19, 1968
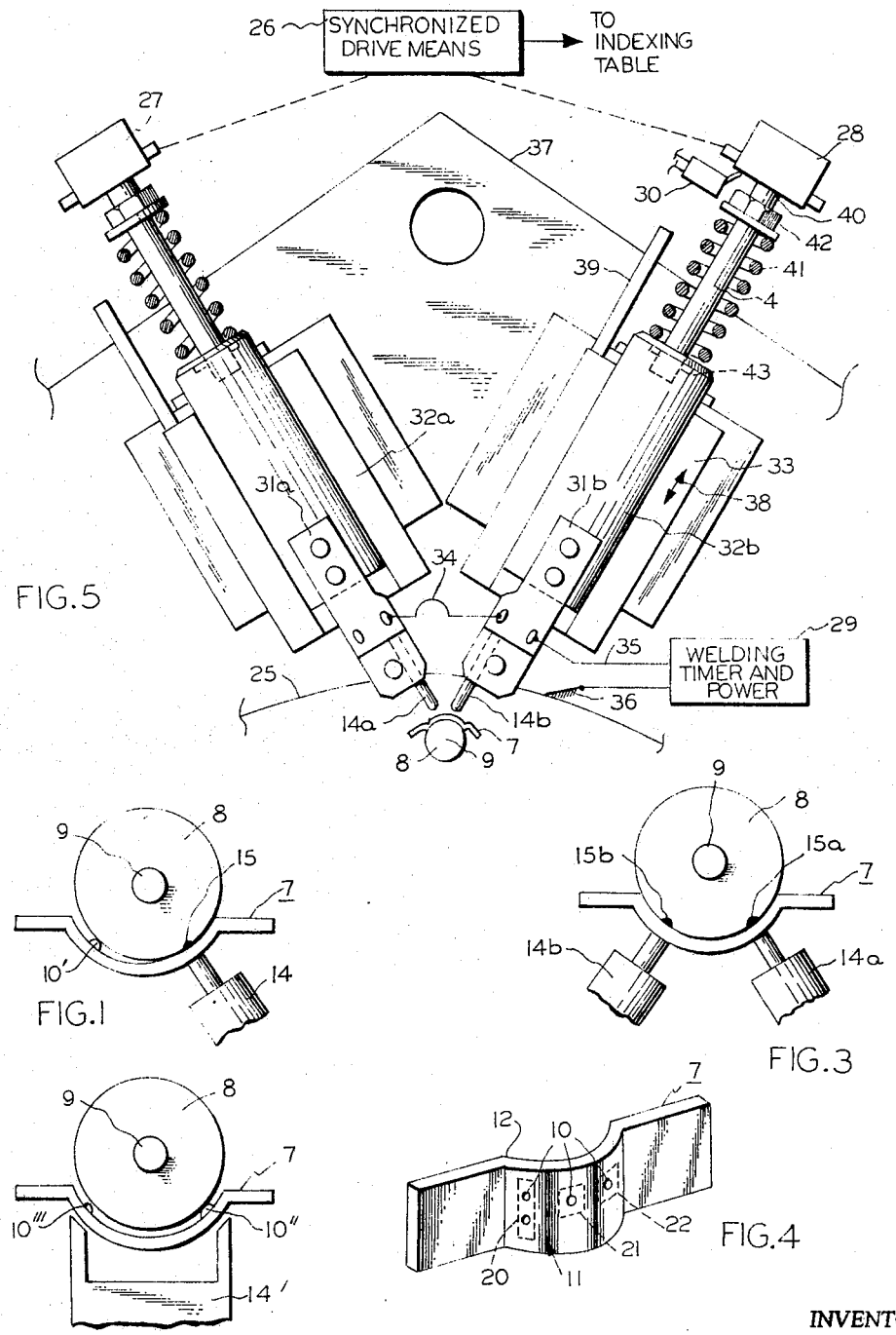
INVENTOR
CHESTER O. MERCHANT
BY Laurence R. Brown
ATTORNEY

United States Patent Office 3,509,306
Patented Apr. 28, 1970

3,509,306
METHODS OF PROJECTION WELDING MOUNTING STRAPS TO CATHODE RAY ELECTRODES AND THE LIKE
Chester O. Merchant, Owensboro, Ky., assignor to Kentucky Electronics, Inc., Owensboro, Ky., a corporation of Delaware
Filed Mar. 19, 1968, Ser. No. 714,218
Int. Cl. B23k 9/00, 11/10
U.S. Cl. 219—78        3 Claims

ABSTRACT OF THE DISCLOSURE

A method of projection welding a thin curved strap with projections onto a mating curved cylindrical surface of a cylindrical cathode ray tube electrode is disclosed. Individual spring loaded welding probes are directed normally to the tangent of the curved surface at a plurality of separate positions adjacent the projections in the strap to force the strap uniformly against the body during welding with a predetermined force to achieve a face to face contact over the mating curved surfaces.

---

This case relates to projection welding methods and, more particularly, it relates to methods of welding a thin curved strap onto a mating curved surface of a cylindrical cathode ray tube electrode, or the like.

Projection welding techniques for cathode ray tube electrodes are exemplified by my U.S. Patents 3,317,770 issued May 2, 1967, and 3,352,994 issued Nov. 14, 1967, respectively for "Cathode Ray Tube Electron Gun And Support Therefor" and "Method Of Making An Electrode Component." The state of the art of projection welding in general is exemplified in an article in the Welding Journal for August 1948, pp. 610–612 by Robert A. Reich entitled "Modern Projection Welding." The specialized art of welding curved surfaces to mating curved surfaces is represented by U.S. patents as follows: L. S. Bachman, 945,554, Jan. 4, 1910 for "Utensil And Handle"; C. E. Bleicher, 1,872,394, Aug. 16, 1932 for "Projection Welding" and E. B. Anderson, 2,299,001, Oct. 13, 1942 for "Universal Joint."

In the cathode ray tube art, precision mechanical position tolerances must be obtained in welding thin curved straps to cylindrical electrodes. Very small variations of position can cause defective electron beams, particularly when the electrodes are assembled in three gun color picture tubes. This art also demands absence of whiskers, flaking and blemishes which can cause corona discharge. Because of repeated cycling from low temperature to operation at high temperatures, all mechanical stresses must be alleviated, and the surfaces must be in mutual contact over their mutually mated contours without twists, bends, or spaces. Both the straps and the electrodes are of thin metal and the weld penetration must be carefully controlled. Thus, the projection welding techniques required are precise and critical and need careful control.

It is therefore a general object of the invention to provide improved methods of precision projection welding of two thin curved parts together with mating surfaces in contact.

Another object of the invention is to provide methods of welding two thin cylindrical parts together without mechanical stresses or welding blemishes.

A further object of the invention is to provide methods of welding thin curved metal straps in precise position upon a body with a mating curved contour.

In accordance with the teachings of this invention a thin curved metal strap with a plurality of spaced projections thereon is held adjacent a cylindrical electrode with a plurality of individual welding probes at different projection locations, each probe being spring loaded to exert a predetermined force. Welding currents are passed through all projection points simultaneously to cause the strap to move against the electrode in face to face contact over its entire mating surface. Each probe and projection are of small area away from the edges of the strap to surround each weld position with unwelded strap to electrode surfaces in face to face contact.

Further features, objectives and advantages of the invention will be understood from the following detailed description, which makes reference to the accompanying drawings, in which:

FIGURES 1 to 3 are top views of an electrode strap assembly with various electrode configurations shown in part;

FIGURE 4 is a perspective view of a strap with a plurality of projections positioned thereon; and FIGURE 5 is an assembly view, partly in block diagram, of welding apparatus which operates in accordance with the teachings of this invention.

As may be seen from the drawings, a thin metal mounting strap 7 is provided with a curved surface area mating with the outer surface of a cylindrical grid electrode 8 for a cathode ray tube, which passes an electron beam through aperture 9. Each strap has a plurality of projections 10 inwardly directed from the concave strap portion 11 and suitably spaced away from the edges 12 of the strap so that the two pieces 7 and 8 may meet in face to face contact over their mating curved surfaces after the welding process.

Consider the view of FIGURE 1, where a welding electrode or probe 14 is directed substantially normal to the tangent of the strap surface along a radius of the cylinder 8 to contact the strap at a small region adjacent a projection on the strap 7. Such an electrode may be directed by hand or by machine into position for welding at the proper location, with the strap 7 preferably precisely located in position adjacent electrode 8 by means of suitable tooling or jigs including an anvile inside the cylindrical electrode 8. During the welding process, probe 14 is forced against strap 7 with a predetermined pressure while welding current is passed through the probe, so that the two pieces 7 and 8 are welded together in face to face contact with the projection penetrating the body of the electrode 8 to some extent but not enough to blemish or break the interior surface.

As may be seen when the single welding electrode 14 is used, the welding currents are confined to region 15, and the projection 10' may hold the strap away from its mating face to face contact position at one end. Thus, a sequential welding operation at projection 10' would necessitate the elastic bending of strap 7 into face to face contact position while held by the first weld. Thus, a weak weld would be formed, which could rupture with thermal or mechanical stresses to change the strap position, or expose corona emitting surfaces.

As shown in FIGURE 2, welding at all projection positions may take place simultaneously by using a single multi-pronged welding head 14'. However, this arrangement contacts the surface of strap 7 with a shear force with a significant tangential component. Furthermore, the projections may not be in uniform contact with the surface of electrode 8 as indicated by the longer projection 10" and the shorter one 10'''. This results in uneven current distribution and possible misalignment, elastic stresses or whiskering.

Accordingly, the preferred manner of projection welding to attain precision uniform welding under the conditions necessary to meet quality requirements of cathode ray tube grid electrodes is illustrated by FIGURE 3. Thus, a plurality of welding electrodes 14A, 14B is provided for simultaneously pressing against the strap 7 at corresponding projection areas 15A, 15B while the welding current is simultaneously applied through each electrode. This results in a good face to face contact of the two pieces over their entire mating surfaces with good welds at each projection and tends to compensate for variations in projection heights or areas.

The strap shown in FIGURE 4 illustrates by dotted lines the possible electrode configuration. On a cylindrical surface it is desirable to direct the electrodes on a substantially radial line into the cylinder so that two projections may be encompassed by a single probe at region 20, whereas regions 21 and 22 would require separate probes to avoid the problems set forth in connection with FIGURE 2.

With these preferred principles in mind, consider now the system of FIGURE 5, which may represent an automated machine operating in accordance with the methods proposed by this invention.

Accordingly, an indexed rotary table 25 is driven by a common drive means 26, synchronously timed to operate cams 27 and 28 at a proper time in an operation cycle when the electrode 8 and strap 7 are positioned adjacent electrode assemblies 14A and 14B. The welding power is also synchronously timed to occur during the period the welding heads are forcing strap 7 against electrode 8, by means of welding current means 29. An electric switch 30 coupled to cams 28 might be used for a welding timer for example.

For flexibility of electrical connection, the metallic welding probe holders 31 are mounted in an insulating body 32, which comprises a slide which reciprocates within the guide means 33 as shown by arrow 38. Thus, wire connectors 34 and 35 can be used to connect the probes in parallel or series with suitable welding transformers in welding means 29. The circuit is completed through connecting means such as brush 36 if the indexing table 25 and mounting jigs are metallic conductors.

The guides 33 are mounted on a fixed framework 37 by means of mounting brackets 39, for example. Thus, rotation of cam 28 against stem 40 will push the slide 32 and the welding electrode 14 into contact with strap 7 where it will be held with the predetermined force supplied by loading spring 41. This loading is adjustable by means of nut 42. Stem 4 is retained within slide 32 by means of retainer 43 so that the spring 41 will be compressed after the electrode 14 contacts strap 7.

Since both welding electrodes 14A and 14B operate in the manner described in connection with FIGURE 3, the welding process can meet the exacting position and quality requirements of welds in cathode ray tube electrodes operating at high voltages in precision alignment with other electrodes such as in the three gun assembly of a color picture tube.

Having therefore improved the state of the art and produced superior results with novel welding methods, those features of novelty believed descriptive of the nature and spirit of the invention are set forth with particularity in the appended claims.

What is claimed is:

1. An improved method of projection welding thin curved mounting straps into a precise position with face to face contact over a mating contour of a curved body such as a cylindrical cathode ray tube electrode, wherein the mounting straps have a plurality of projections disposed at different locations on a concave inner surface for welding onto the outer surface of the curved body, comprising the steps of
   (1) directing a plurality of separate movable electrodes into contact with the strap along a path substantially normal to the tangent of the outer strap surface at different projection locations,
   (2) moving the electrodes into contact with the strap surface to hold it against said outer surface of the curved body,
   (3) resiliently urging the electrodes with a predetermined force against the strap when moved thereagainst, and
   (4) applying welding currents to all the electrodes simultaneously while held by said pressure against said body to cause the projections to weld with the mating surfaces of the body while the strap and body come into face to face contact over their entire mating surface area.

2. The method defined in claim 1 wherein the body is a cylindrical cathode ray tube electrode which will be subjected to high voltages, and the projections are located internally of the edges of the straps, including the step of confining the area of contact of the separate electrodes to a small region adjacent the projections and spaced from the edges of the strap, thereby to confine welds to regions completely surrounded by unwelded portions of the mating surfaces in face to face contact.

3. The method defined in claim 1, wherein the body has a curvature with a straight tangential line thereon such as on a cylindrical surface and a plurality of said projections are disposed to lie along said straight line, including the step of providing a contact area of at least one of said electrodes to encompass a plurality of said projections positioned along said straight line.

References Cited

UNITED STATES PATENTS

| 945,554 | 1/1910 | Lachman | 219—93 X |
| 2,179,282 | 11/1939 | Dawson | 219—87 |
| 3,352,994 | 11/1967 | Merchant | 219—93 |

JOSEPH T. TRUHE, Primary Examiner

H. D. JAEGER, Assistant Examiner

U.S. Cl. X.R.

219—87, 93